United States Patent
Pillay et al.

(10) Patent No.: US 7,000,138 B1
(45) Date of Patent: Feb. 14, 2006

(54) CIRCUITS AND METHODS FOR POWER MANAGEMENT IN A PROCESSOR-BASED SYSTEM AND SYSTEMS USING THE SAME

(75) Inventors: Sanjay Ramakrishna Pillay, Austin, TX (US); Raghunath Krishna Rao, Austin, TX (US); Hasibur Rahman, Austin, TX (US); Girish Subramaniam, Austin, TX (US)

(73) Assignee: Cirrus Logic, INC, Austin, TX (US)

( * ) Notice: Subject to any disclaimer, the term of this patent is extended or adjusted under 35 U.S.C. 154(b) by 608 days.

(21) Appl. No.: 09/876,299

(22) Filed: Jun. 7, 2001

(51) Int. Cl.
*G06F 1/04* (2006.01)
(52) U.S. Cl. ...................... 713/600; 713/500
(58) Field of Classification Search ............... 713/100, 713/300, 322, 400, 500, 501, 503, 600; 711/167
See application file for complete search history.

(56) References Cited

U.S. PATENT DOCUMENTS

| | | | | |
|---|---|---|---|---|
| 5,826,092 A | * | 10/1998 | Flannery | ............ 713/324 |
| 5,929,618 A | * | 7/1999 | Boylan et al. | ............ 323/282 |
| 6,564,328 B1 | * | 5/2003 | Grochowski et al. | ........ 713/320 |
| 6,581,164 B1 | * | 6/2003 | Felts et al. | .................. 713/400 |
| 6,633,988 B1 | * | 10/2003 | Watts et al. | ................ 713/322 |
| 6,668,318 B1 | * | 12/2003 | Jenkins et al. | ................. 713/1 |

OTHER PUBLICATIONS

Multi-Clock Generator, Aug. 1998, Burr-Brown Corp.*

* cited by examiner

*Primary Examiner*—Thomas Lee
*Assistant Examiner*—Mark Connolly
(74) *Attorney, Agent, or Firm*—James J. Murphy; Thompson & Knight LLP

(57) ABSTRACT

An adaptive clock throttle 600 interfacing a clock generator 601 generating a high speed clock and a processing engine 602 operating in response to a processing clock. Adaptive clock throttle 600 generates a plurality of lower speed clocks from the high speed clock, estimates a duty cycle of the processing engine, and selectively gates one of the lower speed clocks to the processing engine as the processing clock to increase the duty cycle of the processing engine.

17 Claims, 4 Drawing Sheets

CIRCUITS AND METHODS FOR POWER MANAGEMENT IN A PROCESSOR-BASED SYSTEM AND SYSTEMS USING THE SAME

BACKGROUND OF THE INVENTION

1. Field of the Invention

The present invention relates in general to data and signal processing and in particular to circuits and methods for power management in a processor-based system and systems using the same.

2. Description of the Related Art

The power loading of a data processing engine is often a time-dependent function of the software being run and/or the type of data being processed. For example, if the software is partitioned for batch processing, the current draw of the processing engine increases as instructions execution picks-up and decreases as instruction execution drops-off. Similarly, if data are processed in blocks, the current draw increases as each block is processed and decreases during the "quiet" time between blocks. As the load varies, so does the noise injection into the device substrate. Moreover, as the loading changes, signal edge rise and fall times vary as the current available for driving the corresponding capacitive loads varies, (especially for signals generated from the same voltage supply as the processor).

In almost all applications, the noise caused by a modulated load is undesirable, and in some cases can even be tolerated. In certain applications, however, such as audio decoding and encoding, this noise can significantly impact system performance and adversely affect the quality of the output experienced by the end-user.

SUMMARY OF THE INVENTION

According to one embodiment of the present inventive concepts, an adaptive clock throttle is disclosed for integrating a clock generator generating a high speed clock and a processing engine operating in response to a processing clock. The adaptive clock throttle generates a plurality of lower speed clocks from the high speed clock, estimates a duty cycle of the processing engine, and selectively gates one of the lower speed clocks to the processing engine as the processing clock to increase the duty cycle of the processing engine.

According to additional embodiments of these concepts, the adaptive clock throttle is further operable to selectively mask cycles of the selected lower speed clock to adjust the frequency of the processing clock and/or to produce a series of non-periodic clock cycles.

The total produced effect is to spread the processing of instructions across the entire period of a block without periodicity. This ensures that the electrical load created by the processing engine is relatively constant and without modulation. In turn, substrate noise and/or the modulation of the slope of various signals on the chip is substantially reduced or eliminated.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIG. 1–8 off the drawings, in which like numbers designate like parts.

Figure 1A:
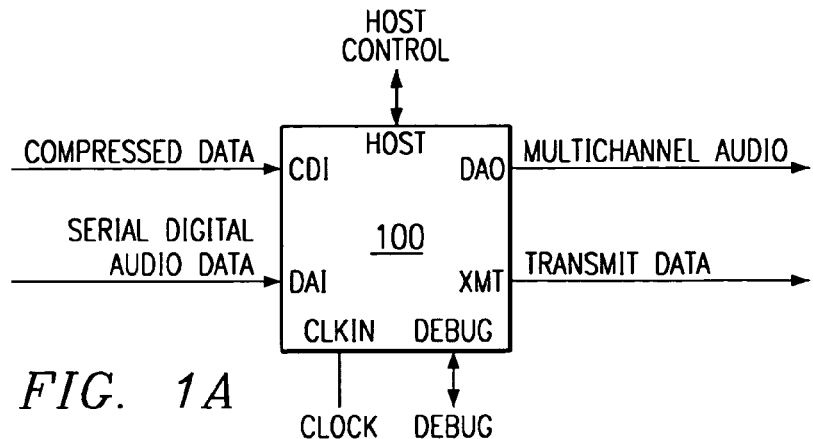
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data conforming to the AC-3 digital audio compression standard, (as defined by the United States Advanced Television System Committee) through a compressed data input port CDI. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 Bitstreams. Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency coefficients. Generally, these overlapping blocks, each composed of 512 time samples, are multiplied by a time window and transformed into the frequency domain. Because the blocks of time samples overlap, each PCM input sample is represented by two sequential blocks factor transformed into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encoding each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC-3 bit stream also includes additional information. For instance, each frame may include a frame header which indicates the bit rate, sample rate, number of encoded samples, and similar information necessary to subsequently synchronize and decode the AC-3 bit stream. Error detection codes may also inserted such that the device such as decoder 100 can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the Advanced Televisions Systems Committee, incorporated herein by reference.

In order to decompress under the AC-3 standard, decoder 100 essentially must perform the inverse of the above described process. Among other things, decoder 100 synchronizes to the received AC-3 bit stream, checks for errors and de-formats the received AC-3 data audio. In particular, decoder 100 decodes spectral envelope and the quantitized mantissas. A bit allocation routine is used to unpack and de-quantitize the mantissas. The spectral envelope is encoded to produce the exponents, then, a reverse transformation is performed to transform the exponents and mantissas to decoded PCM samples in the time domain. Subsequently, post processing of the PCM audio can be performed using various algorithms including digital tone control. The final PCM is converted to an analog signal via a DAC and then processed by a typical analog signal chain to speakers.

Figure 1B:
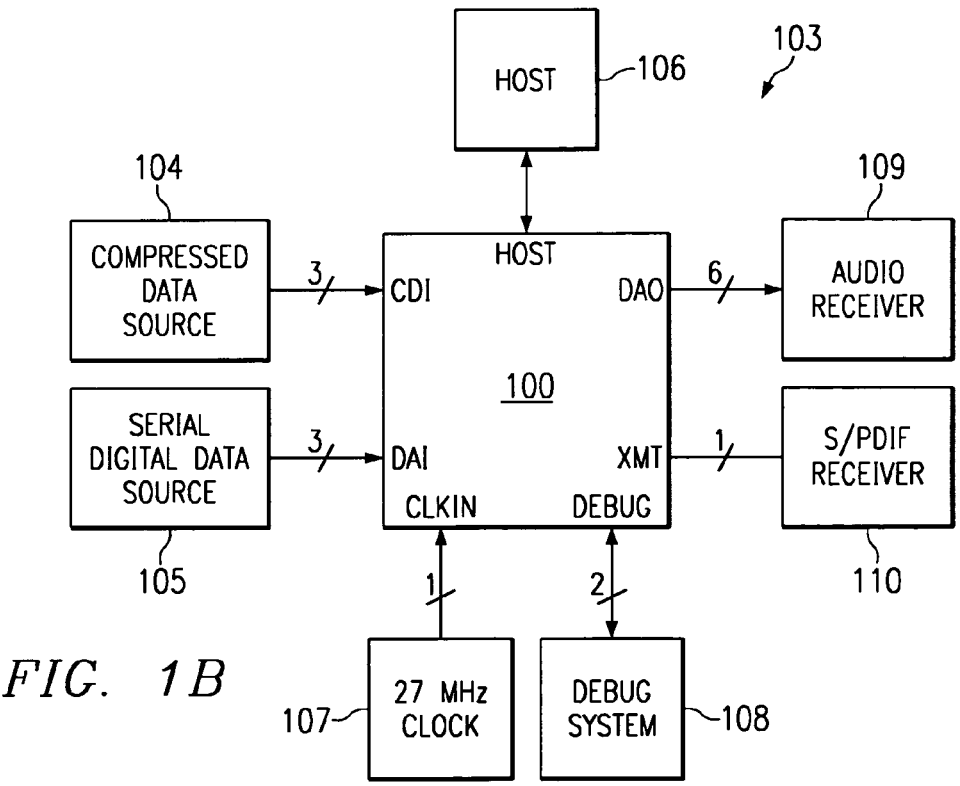
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio source 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to an S/PDIF receiver 110. These outputs may be coupled, for example, to digital to analog converters or codecs for transmission to analog receiver circuitry.

Figure 1C:
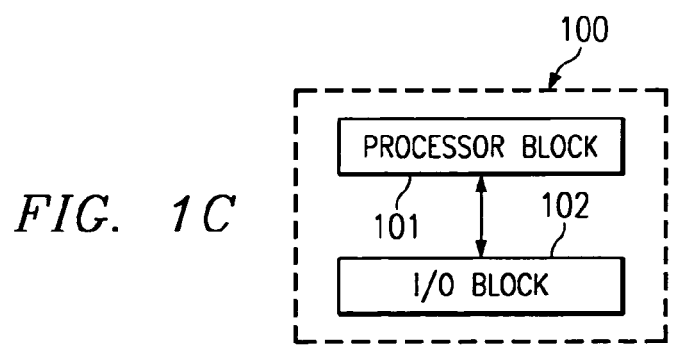
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and the I/O Block 102. Processor Block 106 includes two digital signal processor (DSP) cores, DSP memory, and system reset control. I/O Block 102 includes inter-processor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
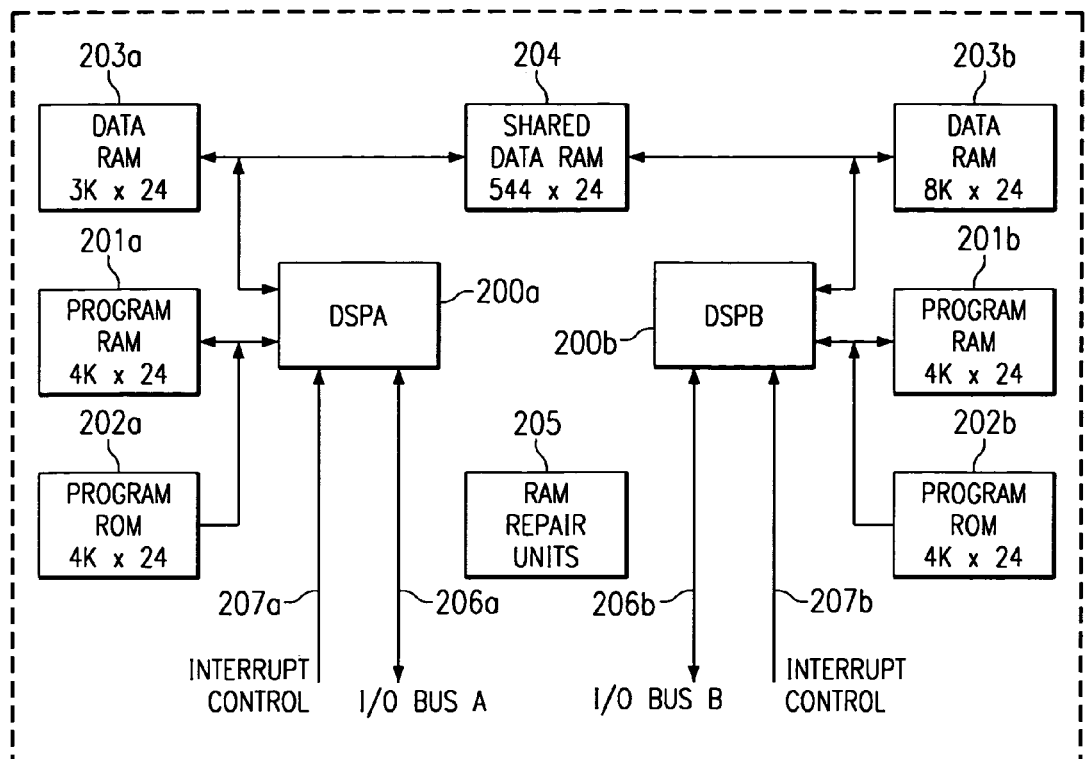
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b. Processor block 101 also contains a RAM repair unit 205 that can repair a predetermined number of RAM locations within the on-chip RAM arrays to increase die yield.

DSP cores 200a and 200b respectively communicate with the peripherals through I/O Block 102 via their respective I/O buses 206a, 206b. The peripherals send interrupt and flag information back to the processor block via interrupt interfaces 207a, 207b.

Figure 3:
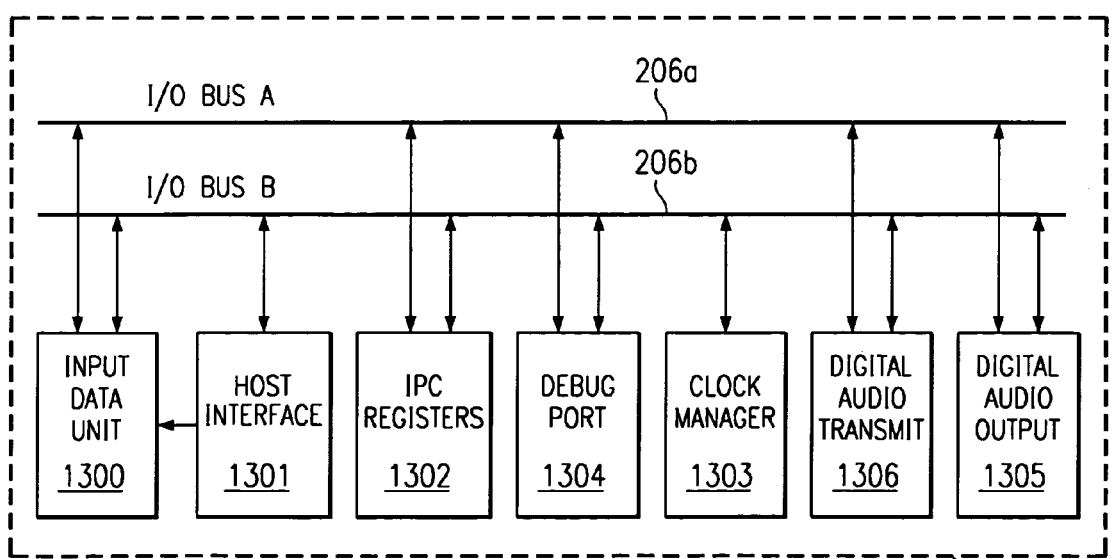
FIG. 3 is a diagram of the primary functional sub-blocks of the I/O block of FIG. 1C.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200*a*) or DSPB (200*b*). Any read or write conflicts are resolved by treating DSPB as the master and ignoring DSPA.

The principles of the present invention further allow for methods of controlling the tone levels of decompressed audio data, as well as for methods and software for operating decoder 100. These principles will be discussed in further detail below. Initially, a brief discussion of the theory of operation of decoder 100 will be undertaken.

In a dual-processor environment like decoder 100, it is important to partition the software application optimally between the two processors 200*a*, 200*b* to maximize processor usage and minimize inter-processor communication. For this, the dependencies and scheduling of the tasks of each processor must be analyzed. The algorithm must be partitioned such that one processor does not unduly wait for the other and later be forced to catch up with pending tasks. For example, in most audio decompression tasks including Dolby AC-3®, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in the DSP, each stage of processing (multiply+accumulate) will introduce noise due to elimination of the lesser significant bits. Adding features such as rounding and wider intermediate storage registers can alleviate the situation.

For example, Dolby AC-3® requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/−0.5 dB from 3 Hz to 20 kHz.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of similar complexity, there will be no waiting on either DSP side. Once the transform for each channel is completed, DSPB can postprocess this PCM data according to the desired algorithm, which could include digital tone control.

Figure 4:
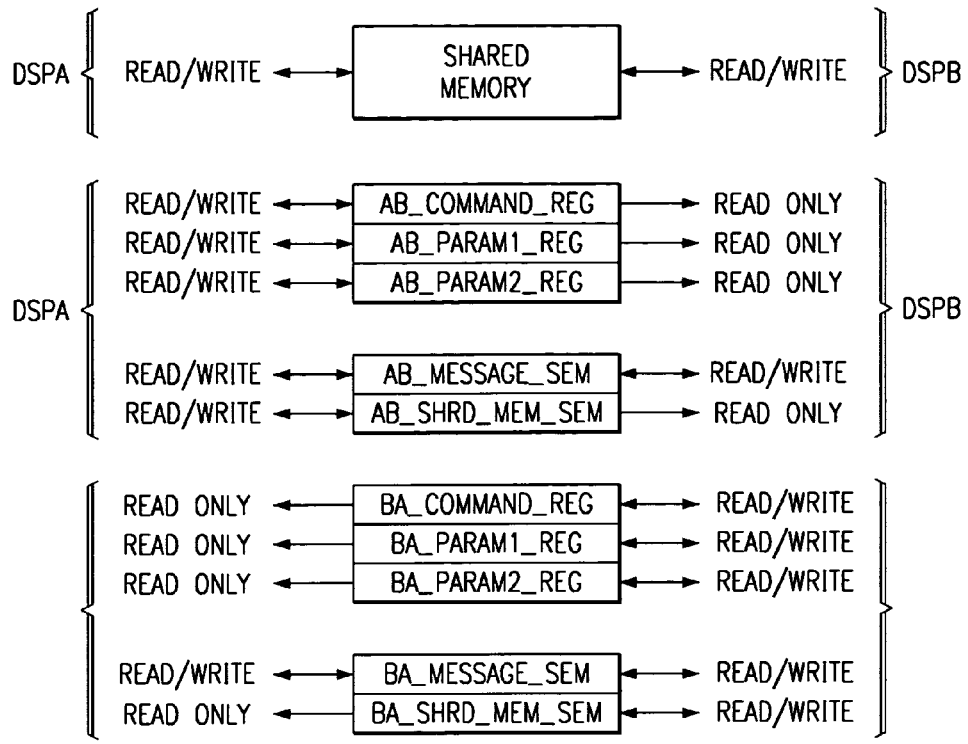
FIG. 4 is a diagram of the inter-processor communications (IPC) registers as shown in FIG. 3.

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this:
 (a) AB_command_register (DSPA write/read, DSPB read only)
 (b) AB_parameter1_register (DSPA write/read, DSPB read only)
 (c) AB_parameter2_register (DSPA write/read, DSPB read only)
 (d) AB_message_semaphores (DSPA write/read, DSPB write/read as well)
 (e) AB_shared_memory_semaphores (DSPA write/read, DSP B read only) where AB denotes the registers for communication from DSPA to DSPB.

Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200*a*, 200*b* can write to or read from shared memory 204. However, software management provides that the two DSPs never write to or read from shared memory in the same clock cycle. It is possible, however, that one DSP writes and the other reads from shared memory at the same time, given a two-phase clock in the DSP core. This way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory_semaphores registers and also different physical portions of shared memory are dedicated to the two data channels. AB_command_register is connected to the interrupt logic so that any write access to that register by DSPA results in an interrupt being generated on the DSP B, if enabled. In general, I/O registers are designed to be written by one DSP and read by another. The only exception is AB_message_sempahore register which can be written by both DSPs. Full symmetry in communication is provided even though for most applications the data flow is from DSPA to DSP B. However, messages usually flow in either direction, another set of 5 registers are provided as shown in FIG. 4 with BA prefix, for communication from DSPB to DSPA.

The AB_message_sempahore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to I. Obviously, in this case both DSPs have to have both write and read access to the same physical register. However, they will never write at the same time, since DSPA is reading flag until it is zero and setting it to 1, while DSPB is reading the flag (if in polling mode) until it is 1 and writing a zero into it. These two processes a staggered in time through software discipline and management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_semaphore register it may receive a message from DSPB, via interrupt, that the coefficients are taken. In this case DSPA resets the semaphore bit in the register in its interrupt handler. This way DSPA has an exclusive write access to the AB_shared-_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the shared memory by DSPB.

The exclusive write access to the AB_shared_memory-_semaphore register by DSPA is all that more important if there is another virtual channel (PCM data) implemented. In this case, DSPA might be putting the PCM data into shared memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending message that it took the data from shared memory and DSPA is setting shared memory flags to zero in its interrupt handler. This way full synchronization is achieved and no access violations performed.

For a complete description of exemplary decoder 100 and its advantages, reference is now made to co-assigned U.S. Pat. No. 6,081,783 entitled "DIGITAL AUDIO DECODING CIRCUITRY, METHODS AND SYSTEMS".

In the case of audio encoding/decoding, data are transmitted and processed as blocks defined by standard protocols. For example, for PCM data, these blocks consist of 16 audio samples, for AC3, 256 samples, and for MPEG Layer 3, 576 samples. As each block is processed, the current draw of the processing engine correspondingly increases as generally illustrated by the solid line in FIG. 5. The dashed-line in this figure corresponds to the power supply droop, which is roughly the inverse of the power supply current draw.

Figure 5:
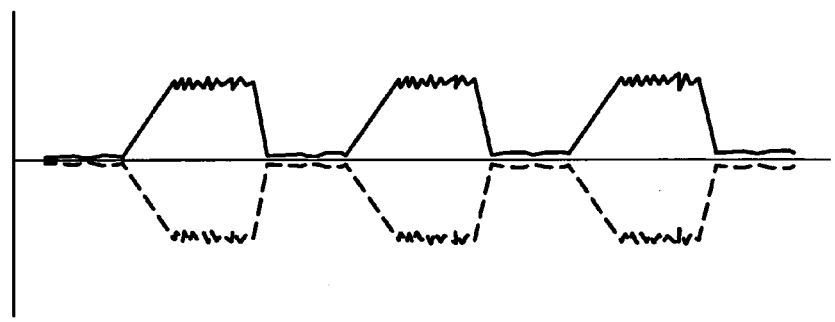
FIG. 5 graphically illustrates the condition where, as each block is processed, the current draw of the processing engine correspondingly increases.

As is apparent from FIG. 5, the noise injected into the substrate as the current load modulates will also be periodic. This noise, as well as its harmonics, can fall within the audible band of the audio output. This is especially true in audio systems in which the digital to analog converters (DACs) driving the audio output are integrated onto the same chip as the processing engine and therefore subject to the same substrate noise injection.

More significantly, as the loading changes with each block of data, the slope of the edges of the clocks used by the DACs, or in the case of an off-chip DAC, used to transmit data to the DACs, modulates. The resulting change in the clock switching points directly contributes to the output noise floor. This is particularly true with respects to changes in the MCLK switching point which drives the DACs. (For a standard serial interface to an off-chip device, the master clock (MCLK), along with the left-right channel clock (LRCLK) and the serial clock (SCLK) are used to time the data transfer and are subject to the same triggering-edge slope modulation).

One possible approach to solving the problems discussed above would be to force the processor to operate continuously, even if the tasks being performed were not strictly necessary to the overall processing operations. For example, the quiet times between processing blocks could be used for the performance of non-critical or even dummy operations such that the power consumption would remain relatively constant. The noise floor would generally increase, but there would be substantially fewer spikes and periodic noise. The more continuous noise is less obviously audible and may be tolerable. However, the primary disadvantage to this approach is power consumption; since the processing engine is constantly executing tasks, it is also constantly consuming power.

Another approach would be to lower the processor clock frequency until the processing of the data is relatively continuous with respect to the data input rate. For example, consider an audio application where the sampling frequency (fs) is 48 kHz and the nominal processing rate of the processor is 49.152 MIPS. Under these conditions, the processor can execute up to 1024 instructions per sample. Notwithstanding, if the given application only requires, for example, 740 instructions per sample, then the processor clock could be reset to a new clock frequency of:

$$740/1024*49.152 MIPS \approx 35.5 MIPS$$

This approach however is difficult to implement, since typically the PLL generating the processor clock, also generates the clocks used in the DAC and/or to transmit data to an external DAC for conversion. It also does not address the problem of a rapidly changing load.

Figure 6:
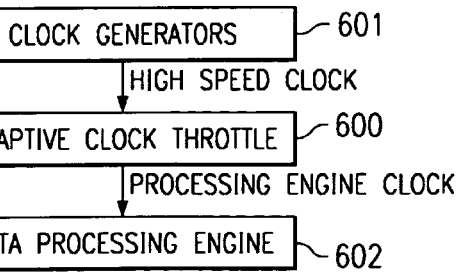
FIG. 6 generally depicts a system including an Adaptive Clock Throttle embodying the inventive concepts.

FIG. 6 generally depicts a system including an Adaptive Clock Throttle 600 embodying the inventive concepts interfacing conventional clock generation circuitry 601 and an associated data processing engine 602 which could be, for example, a digital signal processor (DSP), microprocessor, microcontroller or other circuit block processing data in response to a clock. In the specific example of system 100, clock throttle 600 can be used in conjunction with either DSPA or DSPB and disposed in clock manager block 1303. The operation of Adaptive Clock Throttle is described in further detail in the flow chart of FIG. 7.

According to the principles of the present invention, the processor clock frequency is modulated on an instruction by instruction block basis. In other words, the processor clock rate is varied according to need, as discussed in detail below. In the exemplary case of system 100, the processor clock driving either DSPA, DSPB or both can be varied; the inventive principles are not limited to two DSP devices, or even DSPs.

Figure 7:
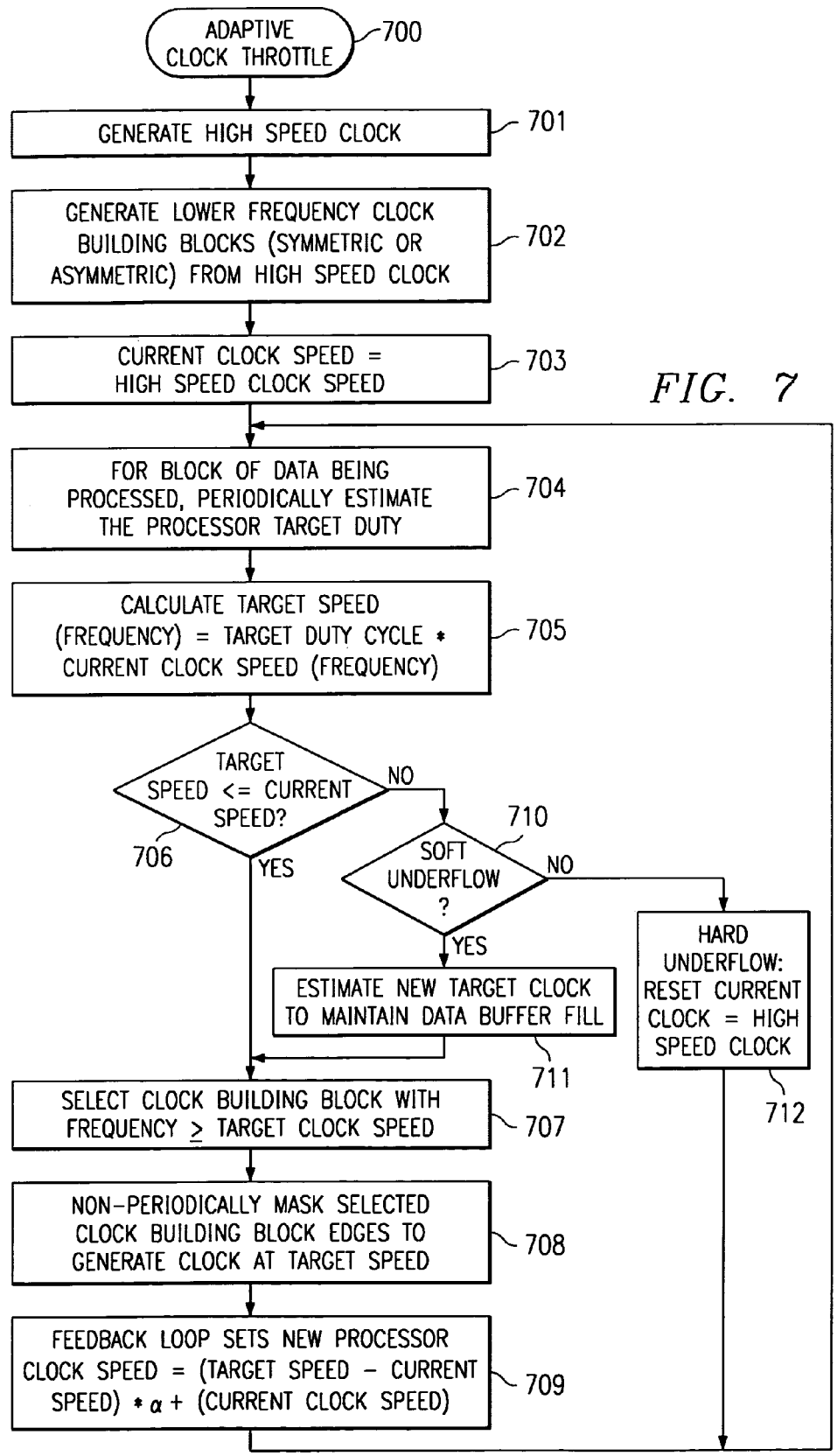
FIG. 7 is a flow chart illustrating the operation of Adaptive Clock Throttle in further detail.

For purposes of the following discussion, a DSP clock frequency of 49 MHz will be assumed for convenience, although the principles of the present invention are also not limited to this clock frequency. In addition to the DSP clock, a high speed clock with a substantially higher frequency than the DPS clock will be generated on-chip. In the present example, the high speed clock will be assumed to have a frequency of 98 MHz, or 2 times the DSP clock frequency of 49 MHz. This is represented in FIG. 7 at Step 701.

Generally, the high speed clock is selected to provide a number of clock edges suitable to generate clock "building blocks" of a desired resolution. These clock building blocks can be generated by dividing down the high speed clock by selected divide ratios (for symmetric clock building blocks) or by selectively gating the high speed clock (for symmetric or asymmetric clock building blocks) at Step 702. For example, from a 98 MHz high speed clock, the following symmetric clocks can be generated by frequency division:

TABLE 1

| Divisor | Frequency | Period |
|---|---|---|
| /1 | 98.0 MHz | 10.18 nsec |
| /2 | 49.0 MHz | 20.35 nsec |
| /3 | 32.67 MHz | 30.52 nsec |
| /4 | 24.50 MHz | 40.72 nsec |

These clocks can then be used to selectively clock the processing engine. First consider the steady state case where PCM data are streamed in 16-sample blocks at a sampling frequency of 48 kHz with the processing engine processing those data at a constant rate of 740 instructions per sample. In this case, the number of clock periods (active edges), assuming 1 clock cycle to execute 1 instruction, of the high speed (98 MHz) per block is:

(1)(740 clock cycles/sample)*(16 samples/block)
=11840 clock cycles/block

Moreover, the active period of 1 PCM block:

(2)(16 samples)*(48 k samples/sec)$^{-1}$=333 psec

Thus, the processing engine clock must be sufficient to provide 11840 clock cycles in 333 μsec.

Given the set of clock building blocks of Table 1, there are number of different combinations that will generate 11840 clock cycles in 333 μsec. One example, in which 98.0 MHz and 24.50 MHz clocks are used, is represented by the equation:

(3)($M$ samples*10.18 nsec)+($N$ samples*40.74 nsec)
=333 μsec, where:

(4)$M+N$=11840 samples for PCM.

In actual practice, the instruction loading is not constant, as the data type changes and/or the processing requirements change. Additionally, the clock building blocks are preferably selected and gated to avoid periodic modulation of the electrical load and the consequent creation of noise in the signal output. The inventive prinicples advantageously address both of these problems.

Figure 8:
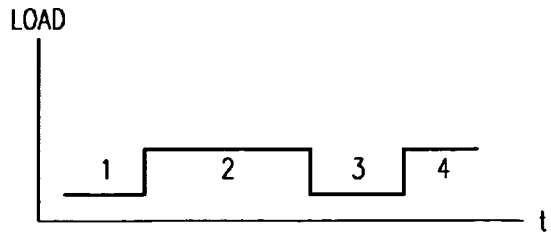
FIG. 8 illustrates the typical processing of a block of data in four primary operating regimes.

During the processing of a block of data, a processing engine typically will execute the necessary instructions and then transition into a sleep mode until the next data are ready and available for processing. FIG. 8 illustrates the typical processing of a block of data in four primary operating regimes. During time Period 1, the processor is in a sleep mode and waiting for data. The processor comes out of sleep during Period 2, receives the new data and executes the instructions necessary for a given task. After the task is complete, the processor returns to sleep during Period 3 while waiting for output space to become available. The processor is active again during Period 4 for outputting the data. In this case, the total duty cycle is:

(5)Duty cycle=$(N_2+N_4)/(N_1+N_2+N_3+N_4)$ where $N_1$, $N_2$, $N_3$ and $N_4$ are the number of processor clock cycles in operating regimes 1–4 respectively. This process then repeats for the next block of data.

Continuing with the present example, the total number of clock cycles available when a 98 MHz high speed clock is used to process a 333 psec PCM block is 32730. However, as calculated above, only 11840 of these clock cycles are required during periods 2 and 4 for actual instruction execution and data I/O; during the remaining clock cycles of the block, the processing engine enters sleep. In other words, only approximately 37% of the clock cycles are required per block for instruction execution.

The goal is then to select the clock building blocks such that use of the clock cycles for instruction execution, along with a number of clock cycles for overhead, approaches 100%.

Initially, the processing engine is operating at the full frequency of the high speed clock, i.e. current speed=high speed clock speed at Step 703 During the processing of one or more blocks of data, the ratio of the number of clock cycles used for executing instructions versus the number of clock cycles in sleep is periodically estimated (Step 704). For example, the estimation could be updated every 256 clock cycles in the block being analyzed (256 has been arbitrarily chosen for discussion purposes and may vary from application to application). This gives a target duty cycle for the processor clock. For example, assume that for a given 256 period, 95 cycles are required for instruction execution; therefore, the target duty cycle is again 37%.

The Target Speed (frequency) for the processor clock is then calculated at Step 705 as:

(6) Target Speed=(Target Duty Cycle)*(Current speed)

The processor clock frequency is updated for the current 256 clock cycles at Steps 706–709. Continuing with the assumption that the target duty cycle is 37%, (i.e. target speed<current speed) this is preferably implemented as follows. Aside from overhead (which can easily be added to the calculation by increasing the duty cycle percentage for example), 37% of the maximum processor clock frequency of 98 MHz is approximately 36.6 MHz and thus a clock speed throttle-back is necessary. The new frequency can be generated by taking the single clock building block of the next highest frequency, in this case the 49.0 MHz frequency from the table, and then selectively masking-off (gating) clock cycles until the frequency of the active edges is approximately 36.6 MHz.

The process of masking off clock cycles can follow a selected pattern (preferably non-periodic) or can be done at random in response to a pseudorandomly generated gating signal. For example, a gaussian (white noise) distribution can be sampled to select the cycles to be masked. In either case, the goal is to eliminate periodicity in the clock and thus periodicity in the modulation of the load. The total produced effect is to spread the processing of instructions across the entire 333 µsec period for the block without periodicity, such that the electrical load created by the processor is relatively constant and without modulation.

Dynamic changes in the processing engine load, for example due to a change in the data being processed or the number of instructions per instruction block, are compensated for by changing the clock duty cycle and/or changing the clock building blocks through a feedback loop in adaptive clock throttle 600.

The first case to consider is when the loading decreases and the processor clock must be throttled-back at decision block 706. Here:

(7) Target speed<Current Speed; and (8) New speed=(Target Speed−Current Speed)*α+Current Speed where α is a factor selected to insure that the feedback loop adjusts the clock frequency in small steps for stability. The new clock is then generated by either masking additional active edges from the current clock building block, or if the new clock frequency is below a lower clock building block, by selecting that lower frequency clock building block and then masking edges as described above.

The second case is when the loading increases (target speed>current speed at Step 706) and the processor clock frequency must be increased to meet the new demand. In the preferred embodiment, a dipstick is used to determine at Step 710 whether the processor data buffers are in a state of "soft" underflow or a state of "hard" underflow as a result in the increase in the data input rate. The dipstick calculations for the data buffer are:

(9) Dipstick=(Write pointer−Read pointer) modsize=Fullness;

and

(10) Emptiness=(Size of Buffer−Dipstick)

where reads from the buffer are typically done on a sample by sample basis, writes fill the buffer in steps or blocks of multiple samples, and modsize is the modulus of the calculation based on the buffer size.

A threshold is then set as a function of the Fullness/Emptiness of the buffer. For 16-sample PCM data blocks, if

(11) (Current Dipstick)−(Previous dipstick)>16 then a soft underflow has occurred and the processor clock frequency is increased by estimating the new target speed needed to keep the data buffers at the appropriate fill level (Step 711), and then resetting the processor clock, as described above.

Notwithstanding, if the buffer empties further or continues to empty even after adjustment of the clock or empties at the high rate, as determined by a second "hard" threshold, then the high speed clock becomes the processor clock for processing at full MIPs, the clock throttle resets and the estimation process discussed above begins anew.

Although the present invention and its advantages have been described in detail, it should be understood that various changes, substitutions and alterations can be made herein without departing from the spirit and scope of the invention as defined by the appended claims.

What is claimed is:

1. An adaptive clock throttle for interfacing a clock generator generating a high speed clock and a processing engine operating in response to a processing clock, the adaptive clock throttle operable to:
   generate a plurality of lower speed clocks from the high speed clock;
   estimate a duty cycle of the processing engine;
   selectively gate one of the lower speed clocks to the processing engine as the processing clock to increase the duty cycle of the processing engine; and
   selectively mask the selected lower speed clock to produce a series of non-periodic clock cycles.

2. The adaptive clock throttle of claim 1 wherein the adaptive clock throttle is operable to mask the selected lower speed clock in predetermined pattern.

3. The adaptive clock throttle of claim 1 wherein the adaptive clock throttle is operable to pseudorandomly mask the selected lower speed clock.

4. The adaptive clock throttle of claim 1 wherein the processing engine comprises a digital signal processor.

5. The adaptive clock throttle of claim 1 wherein at least one of the lower speed clocks is asymmetric.

6. The adaptive clock throttle of claim 1 further operable to:
   monitor the status of an output data buffer of the processing engine;
   detect an underflow condition in the buffer; and
   selectively gate one of the high and lower speed clocks to the processing engine to increase the processing engine operating frequency in response to the underflow condition.

7. The adaptive clock throttle of claim 1 further operable to:
   monitor the status of a data buffer of the processing engine;
   detect an underflow condition in the buffer; and
   selectively remask the selected lower speed clock to increase the processing engine operating frequency in response to the underflow condition.

8. A method of reducing noise in a single-chip system including at least one processor operating on data as blocks in response to a set of instructions, the method comprising the steps of:
   processing a selected block with the processor in response to a processor clock of a selected frequency;
   during the processing of the selected block of data, estimating the processor loading; and
   in response to said step of estimating the processor loading, selectively changing the frequency of the processor clock by selectively masking active edges of the processor clock to more uniformly distribute the processor loading across the processing period of a block.

9. The method of claim 8 wherein said step of estimating the processor loading comprises the substeps of:
   for a selected number of clock periods during the processing of the selected block, counting a number of active clock cycles during which an instruction is executed and a number of sleep dock cycles during which instructions are not executed; and estimating a duty cycle proportional to the processor load from the ratio of the active clock cycles to the sleep clock cycles.

10. The method of claim 8 wherein said step of changing the frequency of the processor clock comprises the substep of:

generating a plurality of clocks of varying frequencies; and gating a selected one of the plurality of docks to the processor as the processor clock.

11. The method of claim 8 wherein said substep of selectively masking comprises the substep of pseudorandomly masking active edges of the clock.

12. The method of claim 8 and further comprising the steps of:

detecting a data underflow condition in the processor; and selectively increasing the frequency of the processor clock in response to the underflow condition.

13. The method of claim 12 wherein said step of detecting a data underflow condition comprises the substep of monitoring a dipstick associated with a data buffer in the processor.

14. An audio decoder for operating on audio data received in blocks comprising:

a digital signal processor for processing blocks of audio data in response to a set of instructions;

clock generation circuitry operable to generate a plurality of clocks, at least one of the plurality of clocks being an asymmetric clock; and an adaptive dock throttle interfacing the digital signal processor and the dock generation circuitry operable to:

estimate the loading on the digital signal processor as the pressor executes instructions to process the blocks of audio data; and selectively gate one of the plurality of docks to the processor as a function of the estimated loading for timing processor operations, the clock selected to distribute the execution of instructions for a selected block of audio data across a period of the selected block to reduce noise.

15. The audio decoder of claim 14 wherein the digital signal processor is a selected one of a plurality of digital signal processors integrated on a single-chip.

16. The audio decoder of claim 14 wherein the adaptive clock throttle is further operable to selectively mask periods of the selected clock to change a frequency of the selected clock.

17. The audio decoder of claim 14 wherein the dock generator is operable to generate the plurality of docks from a high speed clock.

* * * * *